United States Patent Office 3,162,540
Patented Dec. 22, 1964

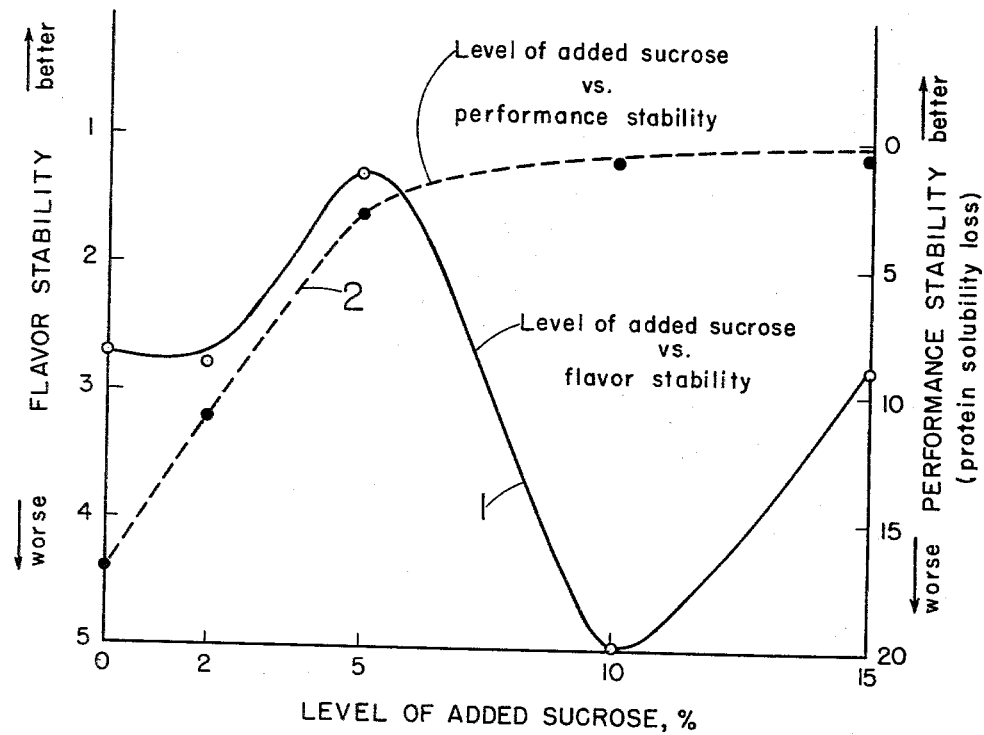

3,162,540
DRYING OF YOLK-CONTAINING EGG LIQUID
Leo Kline, El Cerrito, and Takashi F. Sugihara, Richmond, Calif., assignors to the United States of America as represented by the Secretary of Agriculture
Filed Nov. 8, 1961, Ser. No. 151,113
13 Claims. (Cl. 99—210)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of methods for preparing dried yolk-containing egg liquids. The invention is especially concerned with methods wherein a carbohydrate is added to the yolk-containing egg liquid prior to drying. A particular object of the invention is the exposition of the principles—and the techniques of utilizing these principles—which govern the relationship between quality of the dried product and the type and level of carbohydrate added. Another particular object of the invention is the provision of means for obtaining dried products of optimum quality through control of the type and level of added carbohydrate. Further objects and advantages of the invention will be evident from the following description wherein parts and percentages are by weight unless otherwise specified. Amounts of added carbohydrate are expressed herein on the basis of the precentage thereof in the egg liquid-carbohydrate mixture prior to drying. For example, a reference to dried whole egg prepared with 10% added sucrose means that prior to drying 100 parts by weight of the whole egg-sucrose blend contained 10 parts by weight of sucrose.

The figure in the attached drawing is a graph depicting the flavor and performance of dried whole egg to which had been added different levels of sucrose prior to drying.

In the following description the problems associated with the drying of whole egg and the application of the invention to this material are stressed. It is to be understood, however, that this embodiment is merely illustrative of one phase of the invention; in its broad aspect the invention is applicable to any yolk-containing egg liquid. The latter term is understood to mean any egg liquid which contains a substantial amount of egg yolk, that is, at least 5% of egg lipids (on solids basis). Thus, typical yolk-containing egg liquids are egg yolk, whole egg, fortified whole egg, and whole egg diluted with egg white and the invention can be applied to any of these liquids.

It is well known that whole egg will not make a satisfactory product when dried as such. Although this product initially exhibits useful binding and thickening properties, it has little or no foaming power. Moreover, the product deteriorates rapidly when stored at moderate to elevated temperatures, developing brown colorations, off-flavors, and loss of functional properties. Some twenty years ago it was demonstrated that if 10% sucrose is added to whole egg before drying, the product has improved properties, initially as well as after storage. Thus the product has improved initial performance quality (particularly as to foaming power) and it retains its performance quality as to foaming, binding, and thickening power over longer storage periods. Indeed, such products are a regular article of commerce and are widely used in the baking trade. The following table demonstrates the increase in functional stability attained by the procedure.

TABLE 1

*Dried Whole Egg-Effect of 10% Added Sucrose on Performance*

| Amount of sucrose, percent | Protein solubility,[1] percent | | Sponge cake volume,[1] ml. | | Lipid browning [1] (fluorescence coefficient) | |
|---|---|---|---|---|---|---|
| | Initial | Stored [2] | Initial | Stored [2] | Initial | Stored [2] |
| 0 | 90 | 62 | 517 | 189 | 0.9 | 22.0 |
| 10 | 92 | 92 | 696 | 664 | 0.4 | 2.8 |

[1] Measured by methods described by Kline et al., Food Technology, Vol. 5, pp. 323-331, 1951.
[2] Storage two months at 100° F. in N₂ (products contained 3% H₂O).

The above data, however, do not provide the entire picture. It is true that the addition of 10% of sucrose to whole egg prior to drying results in a product which exhibits improved stability as concerns its functional properties, that is, its aerating, emulsifying, binding and thickening properties. However, the product is not satisfactory with regard to retention of flavor. As a matter of fact the product, whether stored at cool temperatures or at ambient temperatures, will develop oxidative off-flavors more rapidly than the dried untreated whole egg. These off-flavors give the product a fishy odor and taste and offset the gain in functional stability attained by the addition of the sucrose. As a result, the products cannot be used for preparation of foods wherein the flavor is not masked; the products are thus not suitable for preparation of omelets, custards, and, in some cases, cakes and cookies.

It is disclosed in the art (U.S. Patent 2,901,360) that the problem in question can be remedied by substituting for the sucrose a particular type of corn syrup, corn syrup solids, malt syrup, or malt syrup solids, namely, those having a dextrose equivalent of 20–35%, these constituting the so-called low-conversion products. The patentees state that improved results, that is, stabilization of both functional properties and flavor, are attained by incorporating anywhere from 5 to 20% of the low-conversion corn or malt products into the egg liquid to drying.

Contrary to what is disclosed in the prior art, we have found that there is nothing unique about the effect of low-conversion corn syrup or malt syrup products. Our researches have indicated that flavor stability and functional stability can be concomitantly achieved by incorporation of any carbohydrate—including even sucrose or high-conversion corn syrup or corn syrup solids—into yolk-containing egg liquid prior to drying. We have found that the critical item is the correlation of the type of carbohydrate with the amount thereof. A point which has not previously been recognized—and which is one of the principles of this invention—is that the carbohydrate which is added to yolk-containing egg liquid prior to drying exerts varying and, at times, unrelated effects on the functional and flavor characteristics of the product. Thus, one given level of added carbohydrate may provide good flavor stability but poor functional quality and stability whereas a second given level of added carbohydrate may provide the opposite, that is, poor flavor stability but good functional quality and stability. By correlating the type of carbohydrate with the amount added, in accordance with the invention, one is enabled to obtain products exhibiting optimum initial quality and stability, as to both flavor and performance. Expressed in other words, the invention provides a method whereby through judicious selection of the type and level of added carbohydrate, following the concepts taught herein, one is enabled to produce dried yolk-containing egg products which exhibit a combination of desirable properties, that is, not only excellent initial quality as regards both flavor and performance but also stability so that both flavor and performance quality are retained for long periods of time during storage at moderate or elevated temperatures. Moreover, products combining the above-mentioned attributes with instant dispersibility may be produced by application of particular drying methods—such as by drying foams of the egg liquid or by spray drying the egg liquid with injection of gas—in conjunction with the aforesaid selection of the type and level of added carbohydrate.

The principles of the invention are further explained as follows:

(1) We have found that functional quality (including initial quality and that after storage) increases with increasing levels of added carbohydrate, regardless of the nature of the carbohydrate. This factor is demonstrated by the following examples. In these experiments, whole egg containing different levels of added carbohydrate were spray-dried. The products contained 3.5% moisture. The protein solubility and the viscosity (of reconstituted products) as prepared and after storage were measured to determine the percent of protein solubility loss and the viscosity increase. These items are both indicators of high-temperature Maillard-type protein denaturation and both correlate with changes in baking performance, cf. Table 1. It is evident that in these measures of performance stability (protein solubility and viscosity increase), the less the change of either of these items, the greater is the stability of the products. The data obtained is summarized below.

TABLE 2

Dried Whole Egg

[Added carbohydrate vs. retention of performance quality (products stored 4 mos. at 86° F. in $N_2$)]

| Carbohydrate and amount, percent | Protein solubility loss, percent [1] | Viscosity increase, cps.[1] |
| --- | --- | --- |
| None | 17.3 | 571 |
| Sucrose: | | |
| 2 | 11.3 | 574 |
| 5 | 3 | 58 |
| 10 | <1 | 7 |
| 15 | <1 | 0 |
| None | 13.0 | 780 |
| Corn syrup solids 24 D.E. [2] | | |
| 4 | 1.0 | 180 |
| 10 | <1 | 8 |
| 15 | <1 | 1 |
| 20 | <1 | 3 |

[1] As compared to identical products held at −10° F. in $N_2$ atmosphere.
[2] The abbreviation "D.E." used herein means dextrose equivalent.

TABLE 2-A

Dried Whole Egg

[Performance stability with added 42 D.E. corn syrup solids (products stored 3 mos. at 86° F. in air)]

| Amount of 42 D.E. corn syrup solids, percent | Protein solubility loss, percent [1] | Viscosity increase, cps.[1] |
| --- | --- | --- |
| 0 | 18 | 3,455 |
| 4 | 0 | 16 |
| 7.5 | 0 | 5 |
| 10 | 1 | 5 |
| 15 | 0 | 4 |

[1] As compared to identical products held at minus 10° F. in $N_2$ atmosphere.

(2) We have further found that there exists a more complex relationship between (a) the type and amount of added carbohydrate and (b) the flavor stability of the product. Thus in general, as the amount of carbohydrate is increased, the flavor stability will improve until a maximum is reached and then addition of further amounts of carbohydrate will cause a sharp decrease in flavor stability. Moreover, we have found that the amount of added carbohydrate required to achieve maximum flavor stability will vary with different carbohydrates. This variance is believed to be related mainly to the average molecular size of the particular carbohydrate, rather than to its chemical structure.

This item is demonstrated by a series of experiments wherein whole egg containing varying levels of different carbohydrates were spray dried, stored, and then their flavor scored by a taste panel. In these taste tests, the products were made up into a conventional custard. The results are summarized below.

TABLE 3

Dried Whole Egg

[Flavor stability vs. level of carbohydrate (products, containing 3.5% $H_2O$, stored 5 mos. at 55° F. in air)]

| Carbohydrate | Amount of carbohydrate, percent | Flavor rank [1] |
| --- | --- | --- |
| None | None | 2.7 |
| Sucrose | 2 | 2.8 |
| Do | 5 | 1.3 |
| Do | 10 | 5.0 |
| Do | 15 | 3.2 |
| None | None | 2.6 |
| Corn syrup solids, 24 D.E. | 4 | 2.2 |
| Do | 10 | 1.5 |
| Do | 15 | 4.3 |
| Do | 17 | 4.3 |
| None | None | 3.3 |
| Corn syrup solids, 42 D.E. | 4 | 1.4 |
| Do | 7.5 | 1.4 |
| Do | 10 | 3.9 |
| Do | 15 | 4.9 |

[1] 1=least off-flavor:
1.0 to 1.5=no to very slight off-flavor.
1.6 to 3.8=slight to moderate off-flavor.
3.9 or more=pronounced off-flavor.

It is evident from the above data that with added sucrose, maximum flavor stability was achieved with 5% carbohydrate; with 42 dextrose equivalent corn syrup solids, maximum flavor stability was achieved with 7.5% added carbohydrate; with 24 dextrose equivalent corn syrup solids, maximum flavor stability was achieved with 10% added carbohydrate.

The data also illustrate another item of the invention, namely, that the level of added carbohydrate providing maximum flavor stability is proportional to the average molecular weight of the carbohydrate used. Thus, sucrose having the lowest molecular weight is effective in the smallest proportion whereas the 24 D.E. corn syrup solids having the highest average molecular weight (being over 50% dextrins) is required in the largest proportion.

It is further to be noted that the amounts of sucrose, 42 D.E. corn syrup solids, and 24 D.E. corn syrup solids which provide maximum flavor stability in the dried whole egg products also provide excellent performance characteristics and, moreover, the retention of performance of the products is essentially the same. These facts are demonstrated by a series of experiments wherein whole egg containing levels of carbohydrates which provide maximum flavor stability (Table 3) were spray dried and their foaming power measured. The results are summarized below.

TABLE 4

*Foaming Power of Whole Egg Powders Containing Levels of Carbohydrates Which Provide Maximum Flavor Stability*

| Carbohydrate | Amount of carbohydrate, percent | Foaming power, compared to parent liquid, percent |
|---|---|---|
| None | | 14 |
| Sucrose | 5 | 56 |
| 42 D.E. corn syrup solids | 7.5 | 57 |
| 24 D.E. corn syrup solids | 10 | 55 |

The above data further illustrate the point that the nature of the carbohydrate is not critical and that equivalent results can be achieved by the use of a proper level of any given carbohydrate.

(3) A third principle of this invention involves our discovery that the flavor stability is correlated with the mode in which fat is distributed in the dried egg products. Thus in those products wherein the level of carbohydrate is limited consistent with high flavor stability, the fat exists largely in the form of globules which are not finely dispersed in the egg material but are coalesced at or near the surfaces of the particles of egg material. In this form the fat is easily extractable by non-polar solvents, typically an aliphatic hydrocarbon solvent, such as n-hexane. That is, extraction of the product with such solvent will remove a high proportion of the total fat in the product. Another point is that the fat in this form is relatively stable to oxidation so that on storage, the fat will show little evidence of oxidation (rancidification). The last-mentioned factor, of course, accounts for the flavor stability of the products. A further point is that the extractable fat in these products contains a substantial proportion of phospholipids. On the other hand, in those products wherein the level of carbohydrate is increased to a level past the point of maximum flavor stability so that the products exhibit poor flavor on storage in air, the mode of distribution of the fat is entirely different. In these products the fat is intimately dispersed in the egg material in the form of minute particles. Moreover, in this condition the amount of fat which can be extracted with a non-polar solvent (such as aliphatic hydrocarbon solvent) is sharply decreased. Also, the fat in this condition is highly susceptible to oxidation so that on storage of the products the fat is oxidized (becomes rancid). The last factor accounts for the flavor instability of the products. A further item is that the extractable fat in these products is virtually free from phospholipids. The distinct change in the character of the fat in the products—the change from (1) a condition of large globules of fat, easily extractable, stable to oxidation, and containing phospholipids to (2) a condition of dispersed minute particles of fat, extractable with difficulty, unstable to oxidation and essentially free from phospholipids—is herein termed the transition point. The state of the fat in the products wherein it is in large globules, hence easily extractable, is herein termed the coalesced state and the state of the fat in the products wherein it is dispersed in minute particles, hence not readily extractable, is herein termed the dispersed state.

The items discussed above are further demonstrated by the following examples. In these experiments, whole egg containing varying levels of different carbohydrates were dried to 3.5% $H_2O$, stored, and their flavor (in custards) scored by a taste panel. In addition, the stored products were tested to determine their content of extractable fat, using the following method: 200 ml. of "Skellysolve B" (boiling range 146–158° F., essentially n-hexane) and 5 grams (dry basis) of egg powder is shaken for 4 hours in a 250 ml. stoppered flask. The material is then centrifuged and the extract is evaporated to remove solvent. From the weight of the residue and the total fat content of the product (including bound fat) the proportion of extractable fat based on the theoretical fat content is calculated. In some instances, the extracted fat was analyzed for phosphorus. From this determination, the proportion of phospholipids in the fat based on the theoretical amount was calculated. In some instances, the peroxide value (milliequivalents of peroxide per gram of fat) of the extracted fat was determined. The results are summarized in Tables 5 and 6, below.

TABLE 5

*Dried Whole Egg*

Flavor stability vs. fat extractability and peroxide value (product stored 5 mos. at 55° F. in air)]

| Carbohydrate and amount, percent | Flavor rank [1] | Extractable fat, percent of theoretical | Peroxide value |
|---|---|---|---|
| None | 2.7 | 74 | 0 |
| Sucrose: | | | |
| 2 | 2.8 | 74 | 0 |
| 5 | 1.3 | 72 | 0 |
| 10 | 5.0 | 34 | 24 |
| 15 | 3.2 | 2 | 16 |
| None | 2.6 | 74 | 0 |
| Corn syrup solids (24 D.E.): | | | |
| 4 | 2.2 | 65 | 0 |
| 10 | 1.5 | 66 | 0 |
| 15 | 4.3 | 4 | 16 |
| 17 | 4.3 | 1 | 19 |

[1] See Table 3 for ranking system.

The relationship in question is evident from the above data. For example, in the case of added sucrose, maximum flavor stability is achieved at the 5% level in which case the extractable fat is 72%. When, however, the sucrose level is raised to 10%, corresponding to a sharp decrease in flavor stability, the extractable fat drops to 34%. A similar situation is found with the corn syrup solids wherein increasing the carbohydrate level above the level that provides maximum flavor stability (10%) causes the fat extractability to drop from 66% to 4%.

It is also evident that the development of marked off-flavor associated with decreased fat extractability is accompanied by a sharp increase in oxidative rancidity as measured by the peroxide value.

TABLE 6

*Dried Whole Egg*

[Fat extractability and character vs. level of added sucrose]

| Sucrose, percent | Extractable fat, percent of theoretical | Phospholipids in extracted fat, percent of theoretical | Non-phospholipids in extracted fat, percent of theoretical |
|---|---|---|---|
| 0 | 75 | 17 | 98 |
| 2 | 75 | 16 | 98 |
| 5 | 71 | 8 | 95 |
| 10 | 38 | <1 | 52 |
| 15 | 2 | <1 | 2.5 |

It is evident from Table 6, above, that increase in the amount of sucrose above the level (5%) required for maximum stability, causes a sharp decrease in the phospholipid content of the extracted fat, the phospholipids becoming non-extractable, as the emulsion structure is increasingly retained.

The above described information provides a basis by which one can prepare dried egg products of maximum flavor stability using any given yolk-containing egg liquid and any given carbohydrate. In essence, the procedure employed for attaining such a result is as follows: Graded levels of the given carbohydrate are added to samples of the given egg liquid. The resulting samples of egg liquid containing added carbohydrate are dried. The dried products are then examined as to the state of the fat therein. (As hereinafter explained, this examination may involve such techniques as (1) measuring the extractability of the fat, (2) applying optical methods, or (3) determining the phospholipid content of the extracted fat.) This examination thus provides the desired information, namely, which levels of added carbohydrate provide a product wherein the fat is in the coalesced state. This information is then utilized for processing the main body of the given egg liquid. Thus, to this egg liquid is added the highest level of carbohydrate which is consistent with existence of the fat in a coalesced state and the resulting egg liquid containing added carbohydrate is then dried. It is obvious that one should add the *highest* level of carbohydrate (consisting with existence of the fat in a coalesced state) in order to take advantage of two separate factors: (1) that the flavor stability increases with increasing level of carbohydrate up to the transition point and (2) that both initial performance quality and stability of performance properties improve with increasing level of added carbohydrate (as shown in Table 2, above). Accordingly, by applying the procedure explained above, one is assured that the product will exhibit a combination of desirable properties both from the standpoint of flavor and performance.

The complex relationship between (a) the level of added carbohydrate, (b) performance stability, and (c) flavor stability is demonstrated in the attached graph wherein is plotted data on the effect of added sucrose taken from Tables 2 and 3. In the graph, curve 1 represents level of added sucrose vs. flavor stability and curve 2 represents level of added sucrose vs. performance stability (specifically, protein solubility loss). It is evident from the curves that at sucrose levels substantially below 5%, for example at the 2% level, both flavor stability and performance stability are poor. At sucrose levels substantially above 5%, for example at 10%, the flavor stability is very bad while the performance stability is high. However, by employing sucrose at about 5%, one achieves maximum flavor stability coupled with high performance stability. It is to be noted especially that the performance stability increases very rapidly with increasing level of sucrose so that at the 5% level, the performance stability is very close to its peak. It is thus evident that by adding an amount of sucrose which provides maximum flavor stability, there is no real sacrifice of performance stability. Moreover, although the graph is concerned with sucrose particularly, other carbohydrates will display the same pattern, the difference being merely a shift in the actual level of carbohydrate required to attain the flavor peak. Further, although the graph is concerned specifically with whole egg, other yolk-containing egg liquids will display the same pattern, the difference being merely a shift in the level of carbohydrate required to attain the flavor peak.

Various specific techniques which may be utilized in achieving the objects of the invention are separately described below.

(1) *Fat extractability method.*—In applying this system, samples of egg liquid containing different levels of the selected carbohydrate are dried. The fat extractability of the products is then determined by extraction with a non-polar solvent such as an aliphatic hydrocarbon solvent. The resulting data then provides the information for processing the main batch of egg liquid. Thus the level of added carbohydrate is adjusted so that it is just short of the amount at which there is a sharp decrease in fat extractability. Expressed another way, one uses the highest carbohydrate level at which the fat extractability tests of the dried product indicate that the fat is largely in the coalesced state. An advantage of this procedure is that there is no need for conducting flavor assays on stored samples; the fat extraction tests can be run immediately after drying and there is no storage delay (as would be required in a system based on flavor stability evaluation). Accordingly, the invention provides a truly practical system for determining the level of any given carbohydrate required to be added to a given egg liquid to provide dried products of maximum flavor stability.

(2) *Optical method.*—In applying this system, the marked alteration of the state of the fat in the dried products in changing from the coalesced state through the transition point to the dispersed state is utilized for determination of proper level of carbohydrate through optical examination of the dried samples. In using this modification of the invention, the samples of given egg liquid containing graded levels of added carbohydrate are dried, then examined under a microscope, preferably applying a conventional stain such as Nile blue or Sudan 4 to make the fat visible. One then selects for processing the main batch of egg liquid, the highest level of carbohydrate which is consistent with formation of a product in which the fat occurs largely in the coalesced state (in contradistinction to a product wherein the egg fat is intimately dispersed within the egg material). This modification of the invention also has the advantage that no storage of the dried products is needed; the optical tests can be made directly after drying.

(3) *Phospholipid method.*—In this system, samples of given egg liquid containing graded levels of added carbohydrate are dried. The dried products are extracted with a non-polar solvent such as an aliphatic hydrocarbon solvent. The extracted fat is then analyzed for phosphorus to determine the proportion of phospholipids in the fat. One then selects for processing the main batch of egg liquid, the highest level of carbohydrate which is consistent with presence of a substantial proportion of phospholipids in the extractable fat, that is, at least 5% of the theoretical phospholipid content of the egg product. This embodiment of the invention also has the advantage that no storage of the dried products is needed; the phospholipid determinations can be made directly after drying.

To further illustrate the process of the invention, let it be assumed that one is provided with a lot of a yolk-containing egg liquid and a particular carbohydrate. One then proceeds as follows: To samples of the egg liquid are added different levels of the carbohydrate. For example, 1% of carbohydrate is added to one sample, 2% to another, 3% to another, and so on. The carbohydrate-containing egg liquids are dried. The dried samples are then examined, using any of the techniques above described, to determine which samples contain the fat in the coalesced state. Let it be assumed further that the samples to which have been added 1, 2, 3, 4, 5, and 6% carbohydrate all contain the fat in the coalesced state, whereas levels of carbohydrate above 6% yield products with a dispersed fat phase. This data supplies the information needed to process the main batch of egg liquid. Thus to the main batch is added 6% carbohydrate, since this level will not only provide maximum flavor stability but will also give good performance quality, initially and after storage. The main batch of egg liquid containing 6% carbohydrate is then dried to produce the product having the desired combination of properties, both flavor- and performance-wise.

In the above discussion there has been stressed the effect of type and amount of carbohydrate on flavor stability. In a practice of the invention it will be observed that other factors are to be considered which will influence the level of added carbohydrate required to achieve maximum flavor stability. These factors include (a) the presence or absence of salt in the egg liquid (it is quite common to add about ½% of salt, sodium chloride, to egg liquids prior to drying) and (b) the nature of the egg liquid, particularly its total solids content and its yolk content. It is, of course, obvious that such materials as whole egg, egg yolk, fortified whole egg, and whole egg diluted with white, differ from one another in total solids and/or yolk solids content. Moreover, in each category there is variation depending on the method of preparing the liquid. For example, commercial yolk generally contains 43 to 45% yolk solids whereas by exercising more care in the exclusion of residual white clinging to the yolks, one can prepare a yolk liquid containing 50 or 52% yolk solids. In general, addition of an electrolyte such as salt, will decrease the amount of carbohydrate required to achieve a product of maximum flavor stability. Also, a decrease in the amount of total solids in the egg liquid will decrease the amount of carbohydrate required to achieve a product of maximum flavor stability. Thus, a decrease in yolk solids, e.g., in changing from yolk liquid containing 50% yolk solids to yolk liquid containing 43% solids, will require a decrease in the level of carbohydrate required to produce a product of maximum flavor stability. Although the factors discussed—addition of salt or change in character of the egg liquid—cause a shift in the level of carbohydrate required for maximum flavor stability, they introduce no complications as the level of carbohydrate required to achieve the desired result (maximum flavor stability) can still be determined by the procedure explained hereinabove.

The following experiments demonstrate the application of the invention to fortified whole egg which was a blend of (a) 70% liquid whole egg containing about 26% solids and (b) 30% liquid yolk containing about 50% solids. It is recognized that this blend is higher in solids than commercial blends prepared with yolk of 43% solids. In these experiments the stated levels of different carbohydrates were added to the egg liquid, the carbohydrate-containing egg liquids were spray dried, stored, and the flavor scored and their fat extractability measured by the technique described hereinabove. The results are tabulated below.

TABLE 7

*Fortified Whole Egg Powder*

[Flavor stability and fat extractability at graded levels of carbohydrate (products stored 4 mos. at 55° F. in air)]

| Carbohydrate and amount, percent | Flavor rank [1] | Extractable fat, percent of theoretical |
|---|---|---|
| None | 3.0 | 78 |
| Sucrose: | | |
| 5 | 1.7 | 77 |
| 10 | 1.3 | 81 |
| 15 | 5.0 | 2 |
| 20 | 4.0 | 1 |
| None | 3.0 | 78 |
| Corn syrup solids (24 D.E.): | | |
| 5 | 1.5 | 77 |
| 10 | 1.5 | 70 |
| 15 | 4.1 | 9 |
| 20 | 4.4 | 2 |
| 25 | 3.5 | 1 |

[1] 1=least off-flavor:
1.0 to 1.7=no to very slight off-flavor.
1.8 to 3.4=slight to moderate off-flavor.
3.5 or more=pronounced off-flavor.

It is evident from the above data that with fortified whole egg of the above composition, maximum flavor stability is attained with 10% sucrose in contrast to the 5% level of this carbohydrate which gives maximum flavor stabilization with regular whole egg. In the case of 24 D.E. corn syrup solids, 5 to 10% of this carbohydrate gives maximum flavor stabilization with fortified whole egg whereas 10% of the carbohydrate is required with regular whole egg.

In another experiment, graded levels of carbohydrates were added to yolk and the products spray dried, stored and tested for flavor and fat extractability. The egg yolk used in these studies contained 50.2% solids, which is somewhat higher than commercial yolk which generally contains 43–45% solids. The results are tabulated below.

TABLE 8

*Egg Yolk Powder*

[Flavor stability and fat extractability at graded levels of carbohydrate (products stored 4 mos. at 55° F. in air)]

| Carbohydrate and amount, percent | Flavor rank [1] | Extractable fat, percent of theoretical |
|---|---|---|
| None | 2.0 | 75 |
| Sucrose: | | |
| 10 | 1.1 | 65 |
| 15 | 4.5 | 5 |
| 20 | 4.2 | 1 |
| 25 | 3.6 | 1 |
| None | 1.9 | 75 |
| Corn syrup solids (24 D.E.): | | |
| 10 | 1.1 | 68 |
| 15 | 4.2 | 53 |
| 20 | 4.2 | 23 |
| 30 | 3.6 | 3 |

[1] 1=least off-flavor:
1.0 to 1.8=no to very slight off-flavor.
1.9 to 3.5=slight to moderate off-flavor.
3.6 or above=pronounced off-flavor.

It is evident from the above data that with egg yolk of the above composition, maximum flavor stability is attained with 10% sucrose in contrast to the 5% level of this carbohydrate which gives maximum flavor stabilization with whole egg.

The following examples illustrate that the dried egg products containing levels of carbohydrate which provide maximum flavor stability, retain their flavor even during storage at elevated temperatures in air.

In the first run, whole egg containing various levels of added carbohydrate were spray dried. The products, containing 3% $H_2O$, were stored for 3 months at 86° F. in air. The products were then subjected to taste tests in the form of custards. The results are tabulated below.

TABLE 9

*Dried Whole Egg*

| Added carbohydrate | Amount of added carbohydrate, percent | Flavor rank [1] after storage 3 months at 86° F. in air |
|---|---|---|
| Sucrose | 5 | 1.7 |
| Do | 10 | 3.0 |
| 24 D.E. corn syrup solids | 10 | 1.5 |

[1] 1=least off-flavor:
1.0 to 1.7=none to slight off-flavor.
3.0=pronounced off-flavor.

In a second run, fortified whole egg (70% liquid whole egg and 30% liquid yolk equivalent to approximately 46% yolk solids and 54% whole egg solids) containing various levels of added carbohydrate were spray dried. The products, containing 3% $H_2O$, were stored 3 months at 86° F. in air. The products were then used to prepare layer cakes (containing the equivalent of 1½ eggs per 8″ diameter layer) and these cakes were subjected to taste tests. The results are summarized below.

TABLE 10

*Dried Fortified Whole Egg*

| Added carbohydrate | Amount of added carbohydrate, percent | Flavor rank [1] |
|---|---|---|
| None | | 2.3 |
| Sucrose | 5 | 3.0 |
| Do | 10 | 1.5 |
| Do | 15 | 4.3 |
| Do | 20 | 3.8 |
| 24 D.E. corn syrup solids | 10 | 1.1 |
| Do | 15 | 2.6 |
| Do | 20 | 2.3 |

[1] 1=least off-flavor:
1.0 to 1.5=none to slight off-flavor.
1.6 to 3.0=slight to moderate off-flavor.
3.1 to 4.3=moderate to pronounced off-flavor.

In producing dried egg products in accordance with the invention the yolk-containing egg liquid plus added carbohydrate is dried by any of the conventional methods used in egg drying. As in customary practice, the moisture content of the products is usually 1.5 to 8%, preferably 2.5 to 5%. A convenient and generally satisfactory method is to use spray drying techniques wherein the egg liquid is atomized through a nozzle into a large chamber through which heated air is passed. In a preferred technique of spray drying, a gas under pressure is injected into the liquid and the resulting gasified liquid is spray dried. This technique—described and claimed in the copending application of Kline, Meehan, and Sugihara, Serial No. 142,741, filed October 3, 1961, now U.S. Patent No. 3,115,413, entitled "Process of Spray Drying Eggs"—is preferred, particularly because the products have improved dispersibility. Thus when the products are mixed with water to form a reconstituted egg material, the products disperse rapidly even with ordinary hand stirring and form a uniform dispersion without clumping in a matter of a fraction of a minute. In a typical embodiment of this method, the egg liquid to be dried is impregnated with carbon dioxide gas at a pressure of at least 15 lbs. per sq. in. gauge and the resulting gasified liquid is pumped, at a pressure at least as high as that used in the carbonation, to the spray nozzle of the spray drier where the atomized liquid is contacted with hot air in the usual way. Another useful procedure for conducting the drying involves forming the egg material into a foam as by whipping air into it. The resulting foam is then spread onto a surface as a thin layer and this layer of foam is contacted with a current of heated air until the drying is complete. This procedure also has the benefit that the products are especially easy to disperse in water. Application of this system of drying is demonstrated in the following example:

Samples of whole egg were prepared containing varying levels of added sucrose. Each of the samples was diluted with 20% of water, then whipped until they formed a foam having a density of about 0.1. The foams so produced were spread as a layer about ½ inch thick and subjected to a current of air at 120° F. until they were dry. The results of storage studies with these instantly-dispersible products are summarized below.

TABLE 11

*Foam-Dried Whole Egg*

[(Products (3.5% H₂O) stored 2 mos. at 55° F. in air)]

| Sucrose, percent | Flavor rank [1] | Extractable fat, percent of theoretical | Peroxide value |
|---|---|---|---|
| None | 2.3 | 78 | 0 |
| 2 | 2.1 | 78 | 0 |
| 5 | 1.8 | 76 | 0 |
| 10 | 5.0 | 42 | 30 |
| 15 | 3.9 | 4 | 15 |

[1] 1=least off-flavor:
 1.0 to 2.3=no or very slight off-flavor.
 2.4 to 5.0=pronounced off-flavor.

As noted hereinabove any carbohydrate may be used in applying the processes of the invention. Illustrative examples of carbohydrates which may be employed are sucrose, corn syrup or the solids derived therefrom, sorghum syrup or solids, malt syrup or solids, maltose, glucose, fructose, invert sugar, lactose, dextrins and other water-soluble carbohydrates. Mixtures of different carbohydrates can, of course, be used and are included within the ambit of the invention. It also is evident that the carbohydrates can be added to the egg liquid in various forms. For example, one may add the carbohydrates in solid form or they may be added as solutions or syrups. Thus the various corn, malt, sorghum, and similar products may be used in either the syrup or the solidified forms, making due allowance for the different solids content of the different materials. Also, one may use a carbohydrate in conjunction with an edible electrolyte such as salt (sodium chloride.) Because of its low molecular weight, a given amount of salt will have the effect in such a mixture of more than an equal weight of carbohydrate. An especially significant aspect of the invention concerns the use of sucrose or high-conversion corn syrup (or solids), that is, those having a dextrose equivalent of 40 to 60, to provide dried egg products having flavor stability as good as those prepared with low conversion corn syrups (or solids), which result is contrary to prior information.

Having thus described the invention, what is claimed is:

1. A method for determining the proportion of a water-soluble carbohydrate to be added to yolk-containing egg liquid, containing at least 5% egg lipids on a solids basis, prior to drying in order to prepare a dried egg product that exhibits maximum flavor stability combined with high performance quality and stability, which comprises adding graded levels of a selected water-soluble carbohydrate to samples of the egg liquid, drying the carbohydrate-containing samples of egg liquid, and ascertaining the state of the fat in the dried samples, the highest amount of added carbohydrate consistent with existence of the fat largely in the form of globules coalesced at or near the surfaces of the particles of egg material denoting the level of added carbohydrate which will provide a dried product of maximum flavor stability and high performance quality and stability.

2. A method for preparing dried egg products of maximum flavor stability combined with high performance quality and stability from a given lot of yolk-containing egg liquid, containing at least 5% egg lipids on a solids basis, which comprises adding graded levels of a selected water-soluble carbohydrate to samples of the egg liquid, drying the carbohydrate-containing samples of egg liquid, ascertaining the state of the fat in the dried samples, the highest amount of added carbohydrate consistent with existence of the fat largely in the form of globules coalesced at or near the surfaces of the particles of egg material denoting the level of carbohydrate which will provide a dried product of maximum flavor stability and high performance quality and stability, and adding such level of the carbohydrate to the main body of the egg liquid and drying it.

3. The process of claim 2 wherein the carbohydrate is sucrose.

4. The process of claim 2 wherein the carbohydrate is low-conversion corn syrup solids.

5. The process of claim 2 wherein the carbohydrate is high-conversion corn syrup solids.

6. The process of claim 2 wherein the said main body of the egg liquid containing added carbohydrate is injected with a gas under pressure, the gasified material is pumped under a pressure at least as high as that used in the injection to a spray drier nozzle and the material spray dried, whereby to yield a product exhibiting instant dispersibility in addition to the desirable attributes already specified.

7. The process of claim 2 wherein the said main body of egg liquid containing added carbohydrate is formed into a foam, and the foam is contacted with heated air to dry it, whereby to yield a product exhibiting instant dispersibility in addition to the desirable attributes already mentioned.

8. A method for determining the proportion of water-soluble carbohydrate to be added to yolk-containing egg liquid, containing at least 5% egg lipids on a solids basis, prior to drying in order to prepare a dried egg product that exhibits maximum flavor stability combined with high performance quality and stability, which comprises adding graded levels of a selected water-soluble carbohydrate to samples of the egg liquid, drying the carbohydrate-containing samples of egg liquid, and measuring the fat extractability of the dried samples, the highest amount of added carbohydrate consistent with a fat extractability indicative of existence of the fat largely in the form of globules coalesced at or near the surfaces of the particles of egg material denoting the level of added carbohydrate which will provide a dried product of maximum flavor stability and high performance quality and stability.

9. A method for preparing dried egg products of maximum flavor stability combined with high performance quality and stability from a given lot of yolk-containing egg liquid which, containing at least 5% egg lipids on a solids basis, comprises adding graded levels of a selected water-soluble carbohydrate to samples of the egg liquid, drying the carbohydrate-containing samples of egg liquid, measuring the fat extractability of the dried samples, the highest amount of added carbohydrate consistent with a fat extractability indicative of existence of the fat largely in the form of globules coalesced at or near the surfaces of the particles of egg material denoting the level of carbohydrate which will provide a dried product of maximum flavor stability and high performance quality and stability, and adding such level of the carbohydrate to the main body of the egg liquid and drying it.

10. A method for determining the proportion of water-soluble carbohydrate to be added to yolk-containing egg liquid, containing at least 5% egg lipids on a solids basis, prior to drying in order to prepare a dried egg product that exhibits maximum flavor stability combined with high performance quality and stability, which comprises adding graded levels of a selected water-soluble carbohydrate to samples of the egg liquid, drying the samples of the carbohydrate-containing egg liquid, optically examining the nature and distribution of the fat in the dried products, the highest amount of added carbohydrate consistent with existence of the fat largely in the form of globules coalesced at or near the surfaces of the particles of egg material denoting the level of added carbohydrate which will provide a dried product of maximum flavor stability and high performance quality and stability.

11. A method for preparing dried egg products of maximum flavor stability combined with high performance quality and stability from a given lot of yolk-containing egg liquid, containing at least 5% egg lipids on a solids basis, which comprises adding graded levels of a selected water-soluble carbohydrate to samples of the egg liquid, drying the carbohydrate-containing samples of egg liquid, optically examining the nature and distribution of the fat in the dried products to determine the highest amount of added carbohydrate consistent with existence of the fat largely in the form of globules coalesced at or near the surfaces of the particles of egg material, this denoting the level of added carbohydrate which will yeld a dried product of maximum flavor stability and high performance quality and stability, and adding such level of the carbohydrate to the main body of egg liquid and drying it.

12. A method for determining the proportion of water-soluble carbohydrate to be added to a yolk-containing egg liquid, containing at least 5% egg lipids on a solids basis, prior to drying in order to prepare a dried product that exhibits maximum flavor stability combined with high performance quality and stability, which comprises adding graded levels of a selected water-soluble carbohydrate to samples of the egg liquid, drying the samples of the carbohydrate-containing egg liquid, extracting the fat from the dried products and determining the proportion of phospholipids therein, the highest amount of added carbohydrate consistent with a substantial proportion of phospholipids in the dried products denoting the level of added carbohydrate which will yield a dried product of maximum flavor stability and high performance quality and stability.

13. A method for preparing dried egg products of maximum flavor stability combined with high performance quality and stability from a given lot of yolk-containing egg liquid, containing at least 5% egg lipids on a solids basis, which comprises adding graded levels of a selected water-soluble carbohydrate to samples of the egg liquid, drying the carbohydrate-containing samples of egg liquid, extracting the fat from the dried products and determining the proportion of phospholipids in the extracted fat to determine the highest amount of added carbohydrate consistent with the presence of a substantial proportion of phospholipids in the extracted fat, this denoting the level of added carbohydrate which will yield a dried product of maximum flavor stability and high performance quality and stability, and adding such level of the carbohydrate to the main body of egg liquid and drying it.

References Cited by the Examiner

UNITED STATES PATENTS 2,901,360    8/59    Gorman _____ 99—210

FOREIGN PATENTS 547,915    9/42    Great Britain.

A. LOUIS MONACELL, *Primary Examiner.*

ABRAHAM H. WINKELSTEIN, *Examiner.*